United States Patent
Yura et al.

(10) Patent No.: US 6,486,576 B1
(45) Date of Patent: Nov. 26, 2002

(54) PERMANENT MAGNET TYPE STEPPING MOTOR

(75) Inventors: Tsunao Yura, Tokyo (JP); Akira Koike, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 32 days.

(21) Appl. No.: 09/650,826

(22) Filed: Aug. 30, 2000

(30) Foreign Application Priority Data

Sep. 30, 1999 (JP) .............................. 11-278623

(51) Int. Cl.⁷ ................................................. H02K 37/00
(52) U.S. Cl. ................................ 310/49 R; 310/156.45; 310/257
(58) Field of Search ..................... 310/49 R, 156.45, 310/257

(56) References Cited

U.S. PATENT DOCUMENTS

| | | | | |
|---|---|---|---|---|
| 4,012,652 A | * | 3/1977 | Gilbert | 310/162 |
| 4,794,292 A | * | 12/1988 | Torisawa | 310/257 |
| 5,095,238 A | * | 3/1992 | Suzuki et al. | 310/156.46 |
| 5,705,871 A | * | 1/1998 | Suzuki et al. | 310/156.44 |
| 5,847,483 A | * | 12/1998 | Suzuki et al. | 310/156.05 |
| 6,031,304 A | * | 2/2000 | Suzuki et al. | 310/157 |
| 6,191,509 B1 | * | 2/2001 | Yura et al. | 310/254 |
| 6,400,055 B1 | * | 6/2002 | Aoshima et al. | 310/156.01 |

FOREIGN PATENT DOCUMENTS

| | | |
|---|---|---|
| EP | 1 087 502 A2 * | 3/2001 |
| JP | 7-245929 | 9/1995 |
| JP | 7-245930 | 9/1995 |
| JP | 10-127024 | 5/1998 |
| JP | 10-248232 | 9/1998 |
| JP | 2001161055 A * | 6/2001 |

* cited by examiner

Primary Examiner—Joseph Waks
(74) Attorney, Agent, or Firm—Rankin, Hill, Porter & Clark LLP

(57) ABSTRACT

A permanent magnet type stepping motor capable of exhibiting increased rotational angle accuracy and static angle accuracy minimizing a reduction in static torque. The permanent magnet type stepping motor includes a permanent magnet element having n (n: a positive integer of 4 or more) N magnetic poles and n S magnetic poles. A pitch between each adjacent two pole teeth of claw pole type yoke units is set to be constant. Magnetic center-magnetic center pitches between respective adjacent two of the n N magnetic poles and those between respective adjacent two of the n S magnetic poles are not set to be constant at 360°/n but defined to include two or more different pitches between more than 270°/n and less than 450°/n. Also, magnetic center-magnetic center pitches of respective adjacent two of the magnetic poles of the rotor are not set to be constant but defined to include two or more different pitches between more than 135°/n and less than 225°/n.

10 Claims, 5 Drawing Sheets

PERMANENT MAGNET TYPE STEPPING MOTOR

BACKGROUND OF THE INVENTION

This invention relates to a permanent magnet type stepping motor, and more particularly to a permanent magnet type stepping motor adapted to exhibit increased rotational angle accuracy and static angle accuracy and minimize a reduction in static torque.

A typical two-phase permanent magnet type stepping motor which has been conventionally known in the art is generally constructed in such a manner as shown in FIGS. 4 and 5, wherein FIG. 4 is a development view of the stepping motor and FIG. 5 shows relationship between pole teeth of a stator and magnetic poles of a rotor.

In FIG. 4, reference numeral 1 designates a rotor including a cylindrical permanent magnet element 7 securely mounted on a cylindrical bushing 5 fixed on a revolving shaft 3. The revolving shaft 3 is supported by two bearings (not shown). The permanent magnet element 7 is constructed into a cylindrical configuration so as to permit n (n: a positive integer of 4 or more) N magnetic poles and n S magnetic poles to alternately appear at equal pitches thereon in a circumferential direction of the revolving shaft 3. The conventional stepping motor also includes a stator 9 arranged on an outer periphery of the rotor 1 while being mounted in a housing (not shown). The stator 9 includes a first claw pole type yoke unit 11 and a second claw pole type yoke unit 25. The first and second claw pole type yoke units 11 and 25 are arranged in juxtaposition to each other in an axial direction of the revolving shaft 3. The first and second claw pole type yoke units 11 and 25 are shifted from each other in the circumferential direction by a distance one quarter (¼) as large as predetermined pitches P between the magnetic poles of the permanent magnet element 7. The first claw pole type yoke unit 11 includes a first yoke 13 and a second yoke 17 respectively including n pole teeth .15 and 19 arranged opposite to the permanent magnet element 7 at a predetermined interval in a radial direction of the revolving shaft 3 and positioned at predetermined pitches P in the circumferential direction. The first claw pole type yoke unit 11 also includes an exciting winding 21 constructed so as to permit the n pole teeth 15 of the first yoke 13 and the n pole teeth 19 of the second yoke 17 to be excited at polarities different from each other, respectively. The exciting winding 21 is wound on a bobbin 23.

The second claw pole yoke unit 25 likewise includes a first yoke 27 and a second yoke 31 respectively including n pole teeth 29 and 33 arranged opposite to the permanent magnet element 7 at a predetermined interval in the radial direction of the revolving shaft 3 and positioned at predetermined pitches P in the circumferential direction. The second claw pole type yoke unit 25 also includes an exciting winding 35 constructed so as to permit the n pole teeth 29 of the first yoke 27 and the n pole teeth 33 of the second yoke 31 to be excited at polarities different from each other, respectively. The exciting winding 35 is likewise wound on a bobbin 37.

In the conventional permanent magnet type stepping motor thus constructed, as shown in FIG. 5, the pitch P between each adjacent two of the pole teeth 15, that between each adjacent two of the pole teeth 19, that between each adjacent two of the pole teeth 29, that between each adjacent two of the pole teeth 33, and that between two magnetic poles of the permanent magnet element 7 are typically set to be identical with each other or to have the same angle.

Unfortunately, the conventional permanent magnet type stepping motor thus constructed is deteriorated in rotational angle accuracy and static angle accuracy as compared with a hybrid type stepping motor. In order to eliminate such a problem, a variety of techniques were proposed as disclosed in, for example, Japanese Patent Application Laid-Open Publication No. 245929/1995, Japanese Patent Application Laid-Open Publication No. 245930/1995, Japanese Patent Application laid-Open Publication No. 127024/1998, Japanese Patent Application Laid-Open Publication No. 248232/1998 and the like. The techniques proposed are generally constructed so as to vary a configuration of pole teeth or shift one of two yokes from the other yoke at a predetermined pitch in a circumferential direction of a revolving shaft, to thereby reduce a detent torque, resulting in eliminating the above-described problem. Alternatively, in the proposed techniques, it is employed that a correction pole magnet of a phase opposite to a high frequency contained in electromotive force induced due to relative movement between a rotor and a stator is arranged on a magnetic pole of the rotor to suppress a high-frequency component, to thereby eliminate the problem. In the prior art, pitches between pole teeth of each of yokes of claw pole type yoke units are rendered constant.

As described above, those skilled in the art attempted to solve the above-described problem while rendering the pitches between the pole teeth of each of the yokes of the claw pole type yoke units constant. However, this fails to increase rotational angle accuracy and static angle accuracy. Also, the conventional rotor having the correction magnetic poles provided thereon causes a problem of substantially reducing a composite or synthesized static torque.

SUMMARY OF THE INVENTION

The present invention has been made in view of the foregoing disadvantage of the prior art.

Accordingly, it is an object of the present invention to provide a permanent magnet type stepping motor which is capable of exhibiting both increased rotational angle accuracy and static angle accuracy and minimizing a reduction in static torque.

In accordance with the present invention, a permanent magnet type stepping motor is provided. The permanent magnet type stepping motor includes a rotor having a permanent magnet element fixed on a revolving shaft and a stator including two or more claw pole type yoke units juxtaposed to each other in an axial direction thereof. The permanent magnet element is constructed into a cylindrical configuration so as to permit n (n: a positive integer of 4 or more) N magnetic poles and n S magnetic poles to alternately appear at equal pitches thereon in a circumferential direction of the revolving shaft. The claw pole type yoke units each include first and second yokes and an exciting winding. The first and second yokes each include n pole teeth arranged opposite to the permanent magnet element at a predetermined interval in a radial direction of the revolving shaft and positioned at predetermined pitches in the circumferential direction. The exciting winding is constructed so as to permit the n pole teeth of the first yoke and the n pole teeth of the second yoke to be excited at polarities different from each other. The first and second yokes are combined with each other so that the n pole teeth of the first yoke and the n pole teeth of the second yoke are engaged with each other while being kept from being contacted with each other or are alternated with each other while being kept uncontacted with each other.

In the present invention, the respective adjacent two pole teeth of the claw pole yoke unit are arranged at constant pitches. Supposing that a magnetic pole center-magnetic pole center length between each adjacent two magnetic poles of the n N magnetic poles or n S magnetic poles of the rotor is defined to be one pitch ("pitch between centers of homopolar magnetic poles", "magnetic pole center-magnetic pole center pitch between homopolar magnetic poles" or "homopolar magnetic pole center-magnetic pole center pitch") or a sum of magnetic pole widths of the N and S magnetic poles adjacent to each other is defined to be one pitch ("heteropolar magnetic pole width pitch"), the pitches are not defined to be constant at $360°/n$ but defined to be two or more pitches different from each other which are within a range of between more than $270°/n$ and less than $450°/n$. It is a matter of course that a sum of 2n pitches between the respective adjacent two magnetic poles of the 2n magnetic poles is $360°$. Also, magnetic center-magnetic center pitches between the respective adjacent two magnetic poles of the rotor are not defined to be constant at $180°/n$ but defined to be two or more pitches different from each other which are between more than $135°/n$ and less than $225°/n$.

Basically, the present invention is featured in that the above-described homopolar magnetic pole center-magnetic pole center pitch or heteropolar magnetic pole width pitch and the magnetic center-magnetic center pitch between the adjacent two magnetic poles of the rotor are varied within the above-described angular range while keeping the pitch between the pole teeth of the yokes of the claw pole type yoke unit constant. When the pitch between the pole teeth of each of the yokes of the claw pole type yoke unit is rendered constant as in the prior art, a phase of a partial static torque partially occurring between the pitches or a phase from a viewpoint of an electrical angle is caused to be identical. In the prior art, it is attempted to vary a configuration of the pole teeth to vary characteristics of the partial static torque and a configuration thereof, resulting in approaching a synthesized static torque which is obtained due to synthesis of a plurality of partial static torques to a sinusoidal wave. On the contrary, in the present invention, the pitch between the pole teeth of the two yokes adjacent to each other is rendered constant, whereas the magnetic center-magnetic center pitch between adjacent two magnetic poles of the rotor and the homopolar magnetic pole center-magnetic pole center pitch or heteropolar magnetic pole width pitch is shifted to shift a phase of each of the partial static torques, to thereby approach characteristics of the synthesized static torque to a sinusoidal wave.

Basically, so long as such construction permits characteristics of the synthesized static torque to be approached to a sinusoidal wave or attains a reduction in detent torque and an increase in rotational angle accuracy and static angle accuracy as compared with the case that the pitch between the magnetic poles of the rotor is constant, a manner of arrangement of the 2n pitches, n homopolar magnetic pole center-magnetic pole center pitch or heteropolar magnetic pole width pitch or a pitch pattern thereof may be varied as desired. Although an arrangement manner or a pitch pattern which leads to the best results has not been found yet, the inventors have found that a variation in pitches within the above-described conditions or ranges permits a specific harmonic component to be reduced or removed, leading to an improvement in characteristics of the synthesized static torque as compared with the prior art. The construction of the present invention that the pitches between the respective adjacent two magnetic poles of the rotor are rendered nonconstant permits a variety of pitch patterns to be employed unless magnetic balance of the stator is highly deteriorated or so long as the magnetic balance is somewhat ensured.

Now, preferred pitch patterns of the rotor which have been found up to date will be exemplified.

In a first pitch pattern, the rotor includes homopolar magnetic poles of n/m (m: a divisor of n other than 1 and n) in each of angular ranges (mechanical angles) of $360°/n$. Also, in the first pitch pattern, a magnetic center-magnetic center pitch between each adjacent two of the n/m homopolar magnetic poles positioned in each of the angular ranges and a magnetic center-magnetic center pitch between each two homopolar poles positioned on each of both sides of adjacent two of the angular ranges are rendered different from each other in order to reduce a detent torque to increase rotational angle accuracy and static angle accuracy and minimize a reduction in static torque. In order to facilitate design of the permanent magnet type stepping motor and manufacturing thereof when the first pitch pattern is employed, the present invention may be constructed in such a manner that the magnetic center-magnetic center pitch between adjacent two of the n/m homopolar magnetic poles positioned in each of the angular ranges is constant and the magnetic center-magnetic center pitch between each two homopolar poles positioned on each of both sides of adjacent two of the angular ranges is constant.

In a second pitch pattern, the rotor includes n magnetic pole pairs each constituted by two heteropolar magnetic poles adjacent to each other. Also, in the second pitch pattern, respective two sets of magnetic pole pairs which are arranged adjacent to each other at every third interval have heteropolar magnetic pole width pitches defined to be different from those of respective two sets of the remaining magnetic pole pairs arranged adjacent to each other at every third interval.

A variation in pitch between the magnetic poles of the rotor when the above-described first pitch pattern is employed may be carried out using any one of two magnetic pole arrangement manners. In a first magnetic pole arrangement manner, the pitch a is reduced as compared with an equal arrangement pitch ($360°/n$). This is referred to as "short pitch arrangement manner". In the short pitch arrangement manner, the magnetic center-magnetic center pitch a between each two of the n/m homopolar magnetic poles positioned in each of the angular ranges is defined to be within a range of $(90°/n)[4-m/(n-m)]<a<(360°/n)$. Also, the magnetic center-magnetic center pitch b between each adjacent two of the magnetic poles positioned on each of both sides of each adjacent two of the angular ranges is defined to be within a range of $(360°/n)<b<(450°/n)$. In the first arrangement manner, the pitch a is reduced as compared with the conventional pitch $360°/n$ and the pitch b is larger than the pitch $360°/n$.

In a second magnetic pole arrangement manner, the pitch a is set to be larger than the equal arrangement pitch $360°/n$. This is referred to as "long pitch arrangement manner". In the long pitch arrangement manner, the magnetic center-magnetic center pitch a between each adjacent two of the n/m homopolar magnetic poles positioned in each of the angular ranges is defined to be within a range of $(45°/n)[4+m/(n-m)]>a>(180°/n)$ and the magnetic center-magnetic center pitch b between each adjacent two of the homopolar magnetic poles positioned on each of both sides of a boundary between each adjacent two of the angular ranges is defined to be within a range of $(180°/n)>b>(90°/n)$.

In the second magnetic pole arrangement manner, the pitch a is increased as compared with the conventional pitch $180°/n$ and the pitch b is smaller than the pitch $360°/n$.

The first and second magnetic pole arrangement manners described above each permit partial static torques occurring at the pitches to be successively shifted to either a negative side or a positive side within an electrical angle of 90°. This results in a detent torque or a harmonic component being decreased, leading to an increase in rotational angle accuracy and static angle accuracy.

When a magnetic center is not varied in each of the angular ranges, the pitches a in each of the angular ranges may be varied within the above-described conditions and the pitches b of m in number may be varied within the above-described conditions. Nevertheless, in order to facilitate design of the permanent magnet type stepping motor, the pitches a and b are preferably constant. In this instance, values of the pitches a and b are set so as to meet relationship $(n-m) \times a + m \times b = 360°$. This not only facilitates design of the permanent magnet type stepping motor and manufacturing thereof but permits rotational angle accuracy and static angle accuracy to be increased.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, the present invention will be described in detail with reference to FIGS. 1 to 3.

Figure 1:
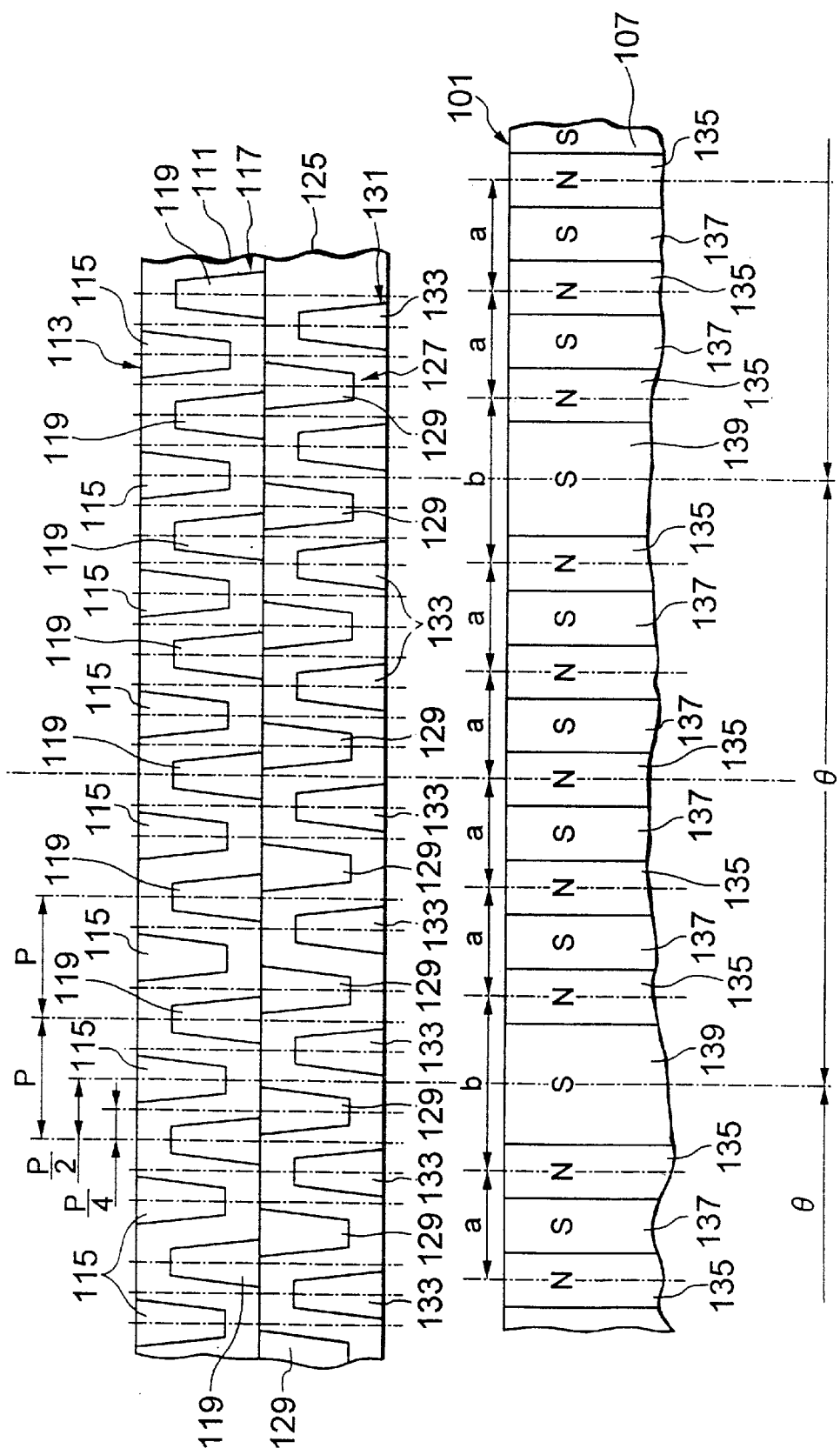
FIG. 1 is a schematic fragmentary development view showing relationship between pole teeth of two claw pole type yoke units incorporated in an embodiment of a permanent magnet type stepping motor according to the present invention and magnetic poles of a permanent magnet element on a side of a rotor.
Figure 2:
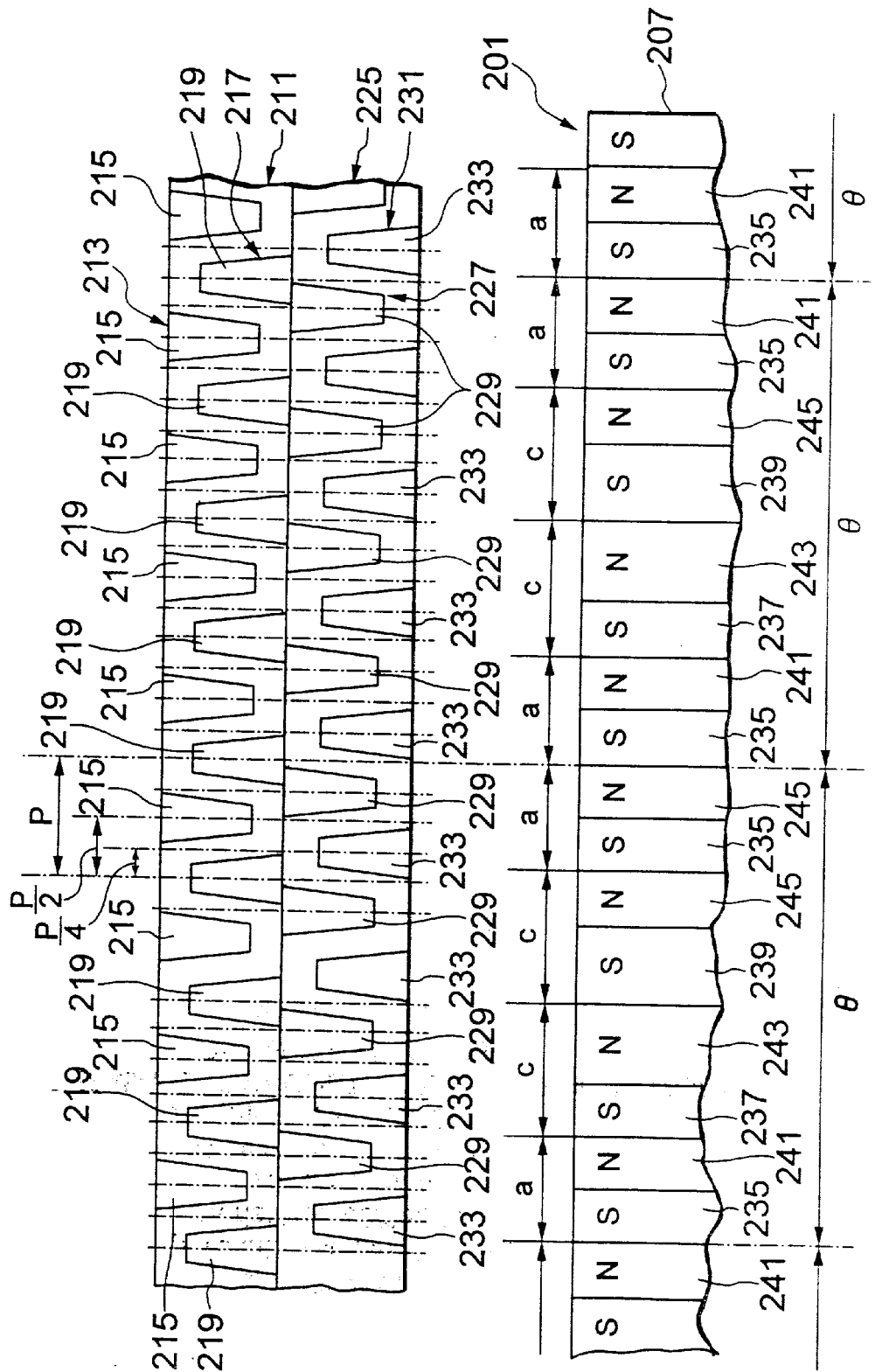
FIG. 2 is a schematic fragmentary development view showing arrangement of pole teeth of a permanent magnet element on a side of rotor in another embodiment of a permanent magnet type stepping motor according to the present invention.
Figure 5:
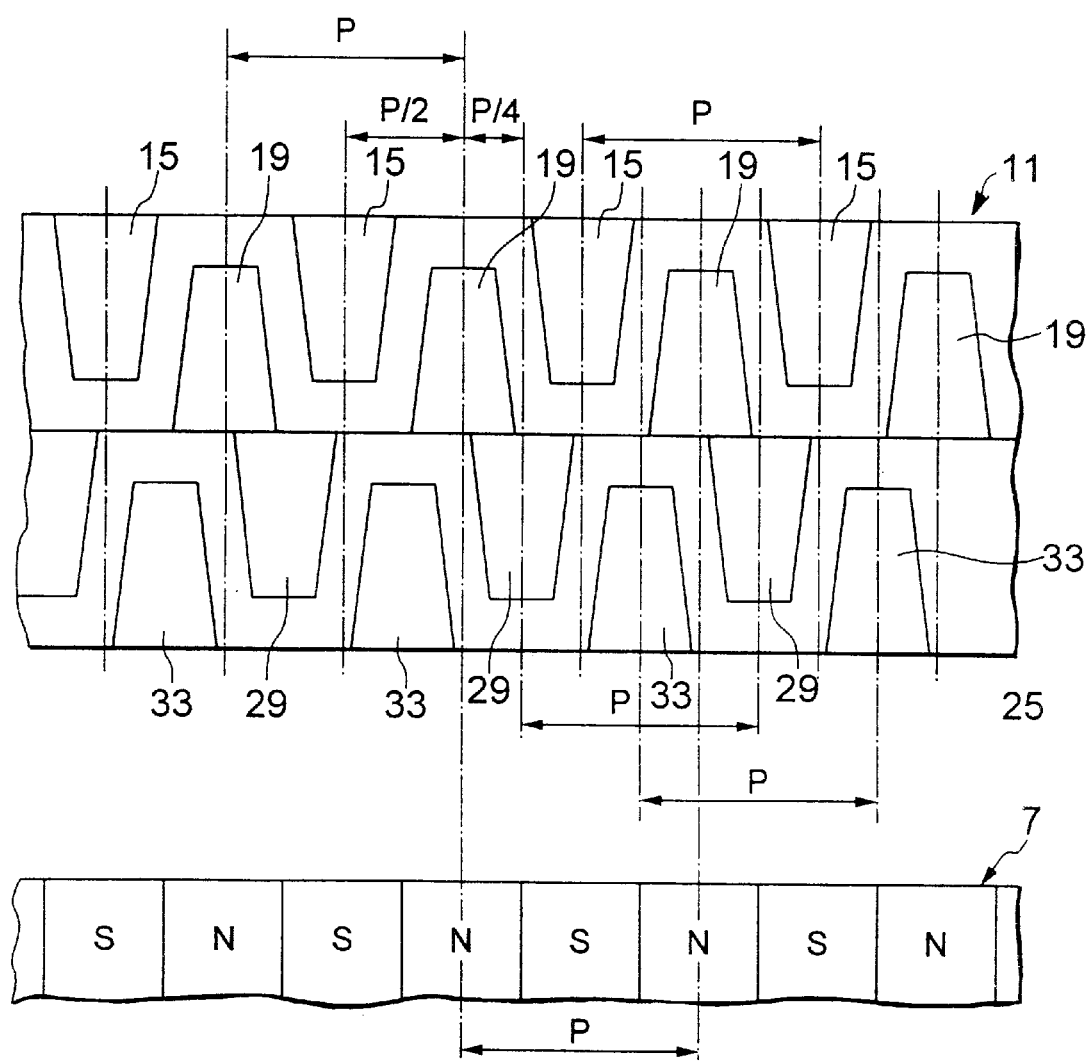
FIG. 5 is a diagrammatic view showing relationship between pole teeth of a stator and magnetic poles of a rotor in the conventional stepping motor shown in FIG. 4.

Referring first to FIGS. 1 and 2, an embodiment of a permanent magnet type stepping motor according to the present invention is illustrated. More particularly, FIG. 1 shows relationship among N magnetic poles 135 of a permanent magnet element 107 on a side of a rotor which have a magnetic pole width kept constant at a/2, S magnetic poles 137 thereof which have a magnetic pole width kept at a/2, S magnetic poles 139 thereof having a magnetic pole width kept at b−a, and pole teeth 115, 119, 129 and 133 of two claw pole type yoke units 111 and 125 in the permanent magnet type stepping motor of the illustrated embodiment, which relationship is obtained when the embodiment is applied to such a two-phase permanent magnet type stepping motor as shown in FIG. 5. In FIG. 1, a length or distance between magnetic centers of each adjacent two magnetic poles having the same polarity is defined to be one pitch while defining a center of each of the N magnetic poles 135 of the permanent magnet element 107 as the magnetic center. The pitch is referred to as "magnetic pole center-magnetic pole center pitch between homopolar magnetic poles" herein. In FIG. 1, the permanent magnet element 107 of the rotor includes fifty (50) magnetic poles (the number n of N magnetic poles=25 and the number n of S magnetic poles=25). Correspondingly, the first and second yokes 113 and 117 of the claw pole type yoke unit 111 each include twenty-five (25) (=n) pole teeth. The number 25 has divisors of 1, 5 and 25. The divisors which may be selected are 1 and 5 other than 25. In the permanent magnet type stepping motor of the illustrated embodiment, the magnetic poles 135, 137 and 139 of the permanent magnet element 107 are so arranged that the N magnetic poles 135 of n/m=25/5=5 in number and the S magnetic poles 137 and 139 of 5 in number are present within each of angular ranges θ (=360°/m=360°/5) obtained by dividing a mechanical angle 360° by the divisor m=5.

In FIG. 1, a pitch a between the magnetic centers of the magnetic poles of the permanent magnetic element 107 employs a short pitch arrangement manner in which the pitch a is defined to be smaller than an equal pitch (=360°/n). In the short pitch arrangement manner, the pitch a between each adjacent two of the n/m magnetic poles positioned within each angular range θ is set to be within a range determined by the following expression (1):

$$(90°/n)[4-m/(n-m)]<a<(360°/n) \qquad (1)$$

Also, a pitch b between magnetic centers of two magnetic poles positioned on both sides of each two of the angular ranges adjacent to each other is set to be within a range determined by the following expression (2):

$$(360°/n)<b<(450°/n) \qquad (2)$$

The expression (1) meets conditions that a sum of differences between the pitches a between the n/m magnetic poles within each of the angular range θ and pitches (360°/n) between the magnetic poles which are arranged at equal intervals is within a range one fourth (¼) (an electrical angle of 90 degrees) as large as each pitch (360°/n) between the magnetic poles arranged at equal intervals. The expression (2) indicates a range of the pitch b which can be taken when the pitch a is determined according to the expression (1). The range defined by the expression (2) is determined on the assumption that relationship $(n-m) \times a + m \times b = 360°$ is established supposing that the pitches a and b each are constant. The pitches a and b which meet the above-described expressions (1) and (2) have two kinds of pitches different from each other within a range which is larger than 270°/n and smaller than 450°/n, respectively. Ranges which the pitches a and b can take when the divisor m=5 is selected under the conditions described above are obtained by inserting n=25 and m=5 into the expressions (1) and (2) described above, as follows:

$$13.5°<a<14.4° \quad 14.4°<b<18°$$

Also, the ranges which the pitches and b take when the divisor m=1 is selected are obtained by inserting n=25 and m=1 into the expressions (1) and (2) described above, as follows:

$$14.25°<a<14.4° \quad 14.4°<b<18°$$

In each of the examples described above, the magnetic poles are arranged in the short pitch arrangement manner.

However, the present invention of course may be effectively applied to a long pitch arrangement manner wherein the pitch a is defined to be larger than the equal pitch (360°/n). In the long pitch arrangement manner, the pitch a between the magnetic centers of the magnetic poles of n/m in number arranged within each of the angular ranges is within a range given by the following expression (3):

$$(45/n)[4+m/(n-m)]>a>(180°/n) \quad (3)$$

wherein m may be selected to be, of divisors (1, 5 and 25) of 25, 1 and 5 other than 25.

The pitch b between the magnetic centers of two magnetic poles positioned on both sides of each two angular ranges adjacent to each other is within a range given by the following expression (4):

$$(180°/n)>b>(90°/n) \quad (4)$$

In the long pitch arrangement manner, the pitch a is rendered larger than the conventional pitch (360°/n) and the pitch b is rendered smaller than the pitch (360°/n).

The expression (3) meets conditions that a sum of differences between the pitch a between the magnetic poles of n/m in number within each angular range θ and each pitch (360°/n) between the magnetic poles arranged at equal intervals is within a range one fourth (¼) (an electrical angle of 90 degrees) as large as each of the pitches (360°/n) between the magnetic poles arranged at equal intervals. The expression (4) indicates a range of the pitch b which can be taken when the pitch a is determined according to the expression (1). The range defined by the expression (4) is determined on the assumption that relationship of (n−m)×a+m×b=360° is established supposing that the pitches a and b each are constant. When m=5 is selected under the above-described conditions, insertion of m=25 and m=5 into the expressions (3) and (4) permits the pitches a and b to be obtained, as follows:

$$7.65>a>7.2$$

$$7.2>b>3.6$$

Also, when m=1 is selected under the above-described conditions, insertion of m=25 and m=1 into the expressions (3) and (4) permits the pitches a and b to be obtained, as follows:

$$7.2749>a>7.2$$

$$7.2>b>3.6$$

Referring now to FIG. 2, another embodiment of a permanent magnet type stepping motor according to the present invention is illustrated. A permanent magnet type stepping motor of the illustrated embodiment is so constructed that pitches of magnetic poles of a permanent magnet element 207 are shifted in a manner different from that in the embodiment described above. In the illustrated embodiment, a sum of widths of magnetic poles of different polarities adjacent to each other is defined to be one pitch. The pitch is referred to as heteropolar magnetic pole width pitch herein. Thus, in the illustrated embodiment employs a viewpoint that a magnetic center is defined at a boundary between magnetic poles different in polarity. More particularly, four sets of magnetic pole pairs which constitute n magnetic pole pairs each constituted by two magnetic poles different in polarity adjacent to each other are arranged within angular ranges θ of 360°/m. Also, a magnetic pole width of each of the magnetic poles is so determined that a heteropolar magnetic pole width pitch of each of two magnetic pole pairs adjacent to each other at every third interval and that of the remaining two magnetic pole pairs adjacent to each other at every third interval are different from each other. Such arrangement of the magnetic poles likewise exhibits substantially the same advantage as described above.

Figure 3:
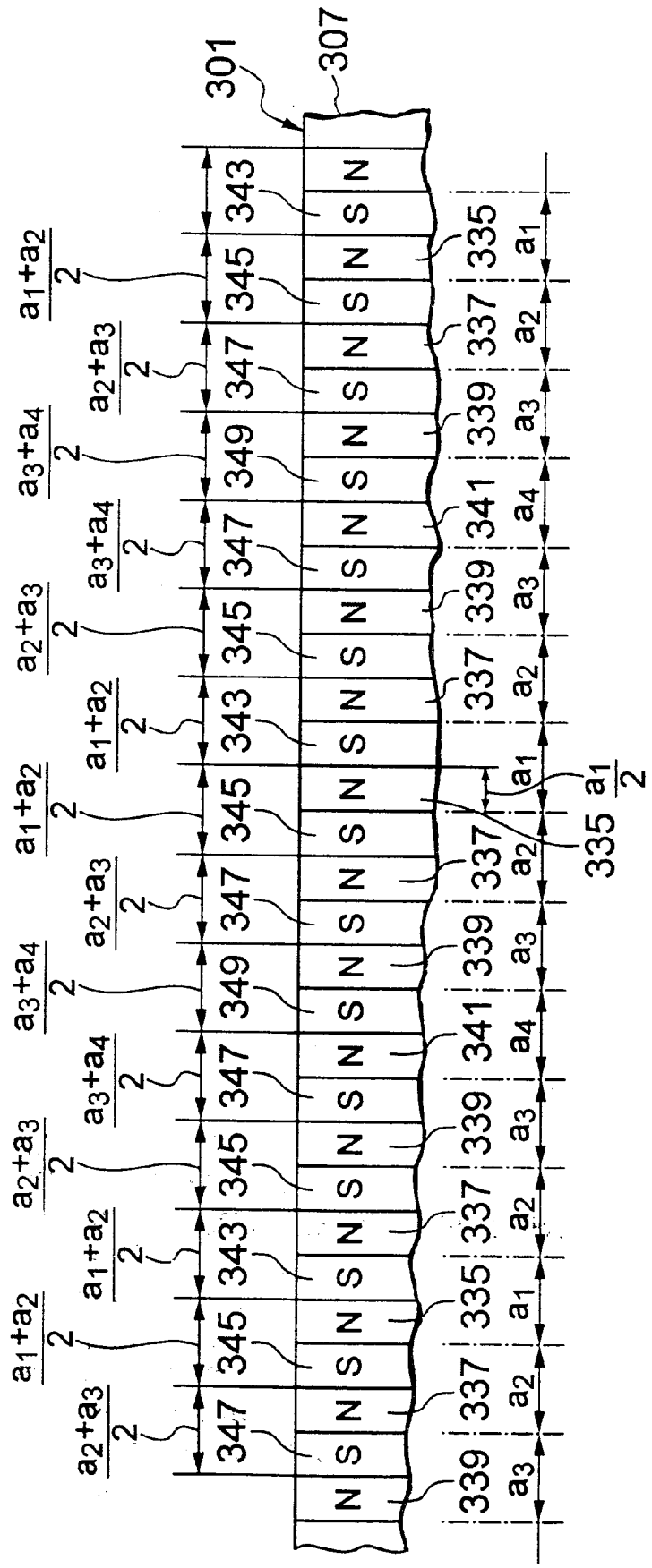
FIG. 3 is a schematic fragmentary development view showing arrangement of pole teeth of a permanent magnet element on a side of a rotor in a further embodiment of a permanent magnet type stepping motor according to the present invention.
Figure 4:
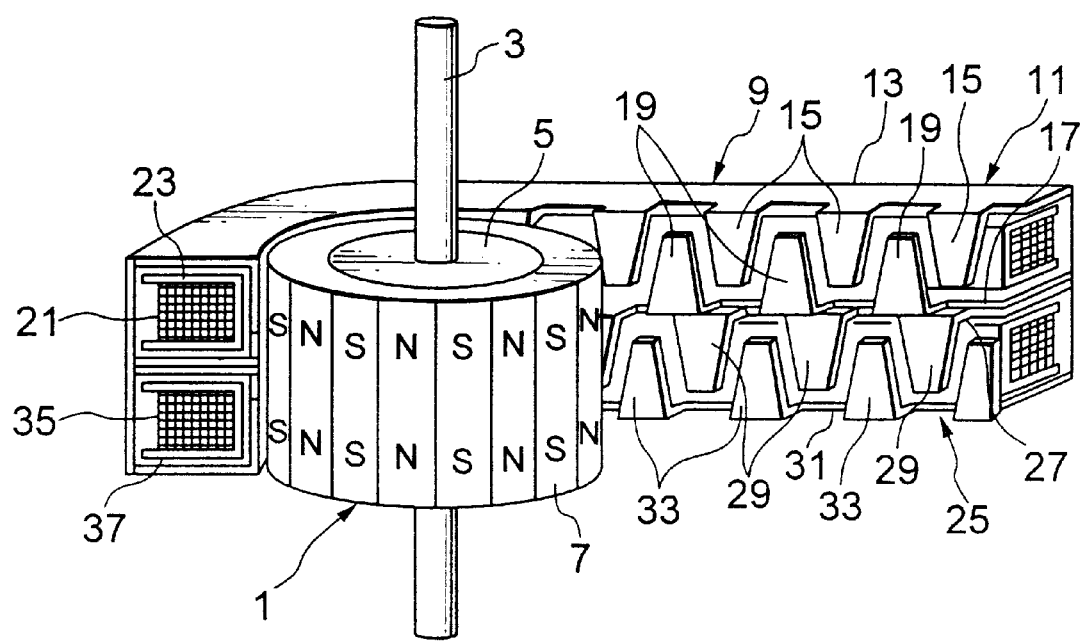
FIG. 4 is a development view showing a conventional two-phase permanent magnet type stepping motor wherein a stator of the stepping motor is developed.

Referring now to FIG. 3, a permanent magnet element 307 on a side of a rotor is illustrated, which is incorporated in a further embodiment of a permanent magnet type stepping motor according to the present invention wherein there is established relationship a4>a3>P>a2>a1 between a constant pitch P of pole teeth of a claw pole type yoke unit and pitches a1 to a4 of magnetic poles of permanent magnet element 307. In the illustrated embodiment, it is supposed that a sum of widths of magnetic poles of different polarities adjacent to each other is one pitch (heteropolar magnetic pole width pitch) as in the embodiment described above with reference to FIG. 2. In FIG. 3, pitches shown above a magnetic pole train indicate dimensions obtained supposing that one pitch is shifted by an amount corresponding to one magnetic pole and are actually identical with pitches shown below the magnetic pole train. In the permanent magnet element 107 shown in FIG. 3, the pitches a3 and a4 of the permanent magnet element on the side of the rotor are large as compared with the constant pitch P of the pole teeth of the claw pawl type yoke unit, whereas the pitches a1 and a2 are small as compared with the pitch P.

This results in the permanent magnet element 307 on the side of the rotor including magnetic poles arranged in a short pitch arrangement manner and those arranged in a long pitch arrangement manner. In particular, in the illustrated embodiment, the pitches a1, a2, a3 and a4 of the magnetic poles of the permanent magnet element 307 has relationship a4>a3>P>a2>a1 to the pitch P. Under such conditions, arrangement of the pitches is determined in an order of a1, a2, a3, a4, a3, a2 and a1 so that dimensions of the pitches are gradually increased and gradually decreased. Also, in the illustrated embodiment, the pitch dimensions are determined so as to meet the following conditions:

$$|P-a3|=|P-a2||P-a4|=|P-a1|$$

Employment of such pitch arrangement and dimensions permits the heteropolar magnetic pole width pitch between each adjacent two magnetic poles of the rotor to be shifted, leading to shifting of a phase of a partial static torque, resulting in characteristics of a synthesized static torque being approached to a sinusoidal wave.

Arrangement of the pitch arrangement described above may be employed when the following conditions are satisfied:

$$(A3-P)-(P-a2)=(a4-P)-(Pal) \geq 0$$

The above-described absolute value conditions are satisfied when the following conditions are established:

$$(a3-P)-(P-a2)=(a4-P)-(Pa1)=0$$

The illustrated embodiment is applied to a two-phase permanent magnet type stepping motor. However, it is a matter of course that the present invention may be effectively applied to a Q-phase (Q: an integer of 3 or more) permanent magnet type stepping motor wherein Q claw pole type yoke units are arranged in an axial direction of the revolving shaft.

In the embodiments described above, the pitch on the side of the rotor is described in connection with the homopolar magnetic pole center-magnetic pole center pitch or heteropolar magnetic pole width pitch. Alternatively, it may be specified to be a pitch between magnetic centers of each adjacent two magnetic poles or a magnetic center-magnetic center pitch between each adjacent two magnetic poles. In this instance, the pitches are not defined to be constant at 180°/n but defined to be two or more different pitches between more than 135°/n and less than 225°/n. Also, under such conditions, the different pitches of two or more kinds are arranged so as to permit a static torque to be approached to a sinusoidal wave.

As can be seen from the foregoing, the present invention is constructed so as to shift pitches between respective at least two magnetic poles adjacent to each other, to thereby shift a phase of a partial static torque occurring between the pitches, resulting in approaching characteristics of composite static torque to a sinusoidal wave. This permits the present invention to provide a permanent magnet type stepping motor which is increased in rotational angle accuracy and static angular accuracy and reduced in static torque.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A permanent magnet type stepping motor comprising:
   a rotor having a permanent magnet element fixed on a revolving shaft;
   said permanent magnet element being constructed into a cylindrical configuration so as to permit n N magnetic poles and n S magnetic poles to alternately appear at equal pitches thereon in a circumferential direction thereof, wherein n is a positive integer of 4 or more; and
   a stator including two or more claw pole type yoke units juxtaposed to each other in an axial direction of said revolving shaft;
   said claw pole type yoke units each including first and second yokes and an exciting winding;
   said first and second yokes each including n pole teeth arranged opposite to said permanent magnet element at a predetermined interval in a radial direction of said revolving shaft and positioned at predetermined pitches in said circumferential direction;
   said exciting winding being constructed so as to permit said n pole teeth of said first yoke and said n pole teeth of said second yoke to be excited at polarities different from each other;
   said first and second yokes being combined with each other so that said n pole teeth of said first yoke and said n pole teeth of said second yoke are engaged with each other while being kept from being contacted with each other;
   said claw pole type yoke unit being so constructed that a pitch between each adjacent two of said pole teeth is constant;
   said n N magnetic poles of said rotor being so arranged that magnetic pole center-magnetic pole center pitches between said magnetic poles are not defined to be constant at 360°/n but defined to be two or more pitches different from each other between more than 270°/n and less than 450°/n;
   said n S magnetic poles of said rotor being so arranged that magnetic pole center-magnetic pole center pitches between said magnetic poles are not defined to be constant at 360°/n but defined to be two or more pitches different from each other between more than 270°/n and less than 450°/n;
   said two or more pitches different from each other being arranged so as to approach composite static torque to a sinusoidal wave.

2. The permanent magnet type stepping motor as defined in claim 1, wherein said rotor includes said magnetic poles of n/m in number arranged in each of angular ranges of 360°/m, wherein m is an integer divisor of n other than 1 and n, said magnetic poles being homopolar; and
   a magnetic pole center-magnetic pole center pitch between each adjacent two of said n/m homopolar magnetic poles positioned in each of said angular ranges is set to be different from a magnetic pole center-magnetic pole center pitch between each adjacent two homopolar magnetic poles positioned on each of both sides of a boundary between each adjacent two of said angular ranges.

3. The permanent magnet type stepping motor as defined in claim 2, wherein said magnetic pole center-magnetic pole center pitch between each adjacent two of said n/m homopolar magnetic poles positioned in each of said angular ranges is rendered constant; and
   said magnetic pole center-magnetic pole center pitch between said each adjacent two homopolar magnetic poles positioned on each of both sides of said boundary is rendered constant.

4. The permanent magnet type stepping motor as defined in claim 1, wherein said rotor includes n magnetic pole pairs each constituted by two heteropolar magnetic poles adjacent to each other;
   respective two sets of magnetic pole pairs which are arranged adjacent to each other at every third interval having heteropolar magnetic pole width pitches defined to be different from those of respective two sets of the remaining magnetic pole pairs arranged adjacent to each other at every third interval.

5. A permanent magnet type stepping motor comprising:
   a rotor having a permanent magnet element fixed on a revolving shaft;
   said permanent magnet element being constructed into a cylindrical configuration so as to permit n N magnetic poles and n S magnetic poles to alternately appear at equal pitches thereon in a circumferential direction thereof, wherein n is a positive integer of 4 or more; and
   a stator including two or more claw pole type yoke units juxtaposed to each other in an axial direction of said revolving shaft;
   said claw pole type yoke units each including first and second yokes and an exciting winding;
   said first and second yokes each including n pole teeth arranged opposite to said permanent magnet element at a predetermined interval in a radial direction of said revolving shaft and positioned at predetermined pitches in said circumferential direction;
   said exciting winding being constructed so as to permit said n pole teeth of said first yoke and said n pole teeth of said second yoke to be excited at polarities different from each other;
   said first and second yokes being combined with each other so that said n pole teeth of said first yoke and said n pole teeth of said second yoke are engaged with each other while being kept from being contacted with each other;

said claw pole type yoke unit being so constructed that a pitch between each adjacent two of said pole teeth is constant;

said n N magnetic poles and n S magnetic poles of said rotor being so arranged that pitches thereof defined supposing that a sum of widths of adjacent N magnetic poles and those of adjacent S magnetic poles is defined to be one pitch are not constant at 360°/n but include two or more different pitches between more than 270°/n and less than 450°/n;

said two or more pitches different from each other being arranged so as to approach composite static torque to a sinusoidal wave.

6. A permanent magnet type stepping motor comprising:

a rotor having a permanent magnet element fixed on a revolving shaft;

said permanent magnet element being constructed into a cylindrical configuration so as to permit n N magnetic poles and n S magnetic poles to alternately appear at equal pitches thereon in a circumferential direction thereof, wherein n is a positive integer of 4 or more; and a stator including two or more claw pole type yoke units juxtaposed to each other in an axial direction of said revolving shaft;

said claw pole type yoke units each including first and second yokes and an exciting winding;

said first and second yokes each including n pole teeth arranged opposite to said permanent magnet element at a predetermined interval in a radial direction of said revolving shaft and positioned at predetermined pitches in said circumferential direction;

said exciting winding being constructed so as to permit said n pole teeth of said first yoke and said n pole teeth of said second yoke to be excited at polarities different from each other;

said first and second yokes being combined with each other so that said n pole teeth of said first yoke and said n pole teeth of said second yoke are engaged with each other while being kept from being contacted with each other;

said claw pole type yoke unit being so constructed that a pitch between each adjacent two of said pole teeth is constant;

said rotor including magnetic poles of n/m in number arranged in each of angular ranges of 360°/m, wherein m is an integer divisor of n other than 1 and n, said n/m magnetic poles being homopolar;

each adjacent two of said n/m homopolar magnetic poles positioned in each of said angular ranges being arranged at a magnetic pole center-magnetic pole center pitch a within a range of (90°/n)[4−m/(n−m)]<a<(360°/n);

each adjacent two of said magnetic poles positioned on each of both sides of a boundary between each adjacent two of said angular ranges being arranged at a magnetic pole center-magnetic pole center pitch b within a range of (360°/n)<b<(450°/n);

said two or more pitches different from each other being arranged so as to approach composite static torque to a sinusoidal wave.

7. The permanent magnet type stepping motor as defined in claim 6, wherein said magnetic pole center-magnetic pole center pitch a of said magnetic poles is within a range of a<(360°/n);

said magnetic pole center-magnetic pole center pitch a of said magnetic poles and said magnetic pole center-magnetic pole center b of said magnetic poles are constant; and said magnetic pole center-magnetic pole center pitch a of said magnetic poles and said magnetic pole center-magnetic pole center pitch b of said magnetic poles are determined so as to satisfy relationship (n−m)×a+m×b=360°.

8. A permanent magnet type stepping motor comprising:

a rotor having a permanent magnet element fixed on a revolving shaft;

said permanent magnet element being constructed into a cylindrical configuration so as to permit n N magnetic poles and n S magnetic poles to alternately appear at equal pitches thereon in a circumferential direction thereof, wherein n is a positive integer of 4 or more; and a stator including two or more claw pole type yoke units juxtaposed to each other in an axial direction of said revolving shaft;

said claw pole type yoke units each including first and second yokes and an exciting winding;

said first and second yokes each including n pole teeth arranged opposite to said permanent magnet element at a predetermined interval in a radial direction of said revolving shaft and positioned at predetermined pitches in said circumferential direction;

said exciting winding being constructed so as to permit said n pole teeth of said first yoke and said n pole teeth of said second yoke to be excited at polarities different from each other;

said first and second yokes being combined with each other so that said n pole teeth of said first yoke and said n pole teeth of said second yoke are engaged with each other while being kept from being contacted with each other;

said claw pole type yoke unit being so constructed that a pitch between each adjacent two of said pole teeth is constant;

said rotor including magnetic poles of n/m in number arranged in each of angular ranges of 360°/m, wherein m is an integer divisor of n other than 1 and n, said n/m magnetic poles being homopolar;

each adjacent two of said n/m homopolar magnetic poles positioned in each of said angular ranges being arranged at a magnetic pole center-magnetic pole center pitch a defined within a range of (45°/n)[4+m/(n−m)]>a>(180°/n);

each adjacent two of said homopolar magnetic poles positioned on each of both sides of a boundary between each adjacent two of said angular ranges being arranged at a magnetic pole center-magnetic pole center pitch b defined within a range of (180°/n)>b>(90°/n);

said two or more pitches different from each other being arranged so as to approach composite static torque to a sinusoidal wave.

9. The permanent magnet type stepping motor as defined in claim 8, wherein said magnetic pole center-magnetic pole center pitch a is within a range of a>(360°/n);

said magnetic pole center-magnetic pole center pitches a and b are constant; and said magnetic pole center-magnetic pole center pitches a and b are determined so as to satisfy relationship (n−m)×a+m×b=360°.

10. A permanent magnet type stepping motor comprising:

a rotor having a permanent magnet element fixed on a revolving shaft;

said permanent magnet element being constructed into a cylindrical configuration so as to permit n N magnetic poles and n S magnetic poles to alternately appear at equal pitches thereon in a circumferential direction of said revolving shaft, wherein n is a positive integer of 4 or more; and a stator including two or more claw pole type yoke units juxtaposed to each other in an axial direction of said revolving shaft;

said claw pole type yoke units each including first and second yokes and an exciting winding;

said first and second yokes each including n pole teeth arranged opposite to said permanent magnet element at a predetermined interval in a radial direction of said revolving shaft and positioned at predetermined pitches in said circumferential direction;

said exciting winding being constructed so as to permit said n pole teeth of said first yoke and said n pole teeth of said second yoke to be excited at polarities different from each other;

said first and second yokes being combined with each other so that said n pole teeth of said first yoke and said n pole teeth of said second yoke are engaged with each other while being kept from being contacted with each other;

said claw pole type yoke unit being so constructed that a pitch between each adjacent two of said pole teeth is constant;

respective adjacent two of said magnetic poles of said rotor being arranged at not a constant magnetic pole center-magnetic pole center pitch of 180°/n but two or more different magnetic center magnetic center pitches a between more than 135°/n and less than 225°/n;

said two or more pitches different from each other being arranged so as to approach composite static torque to a sinusoidal wave.

* * * * *